United States Patent [19]

Heindl et al.

[11] Patent Number: 4,963,302
[45] Date of Patent: Oct. 16, 1990

[54] METHOD AND APPARATUS FOR QUALITY CONTROL OF MOLDED ARTICLES MANUFACTURED BY INJECTION MOLDING MACHINES OR DIE CASTING MACHINES

[75] Inventors: Friedrich Heindl, Baden; Franz Schnuecker, Kottingbrunn; Anton Huber, Berndoft, all of Austria

[73] Assignee: Battenfeld Automatisierungstechnik GmbH, Kottingbrunn, Austria

[21] Appl. No.: 300,969

[22] Filed: Jan. 23, 1989

[30] Foreign Application Priority Data

Jan. 26, 1988 [DE] Fed. Rep. of Germany ....... 3802147

[51] Int. Cl.$^5$ .............................................. B29C 45/76
[52] U.S. Cl. ................................... 264/40.4; 177/145; 177/180; 425/73; 425/140
[58] Field of Search .......................... 425/73, 140, 210; 264/40.4, 232, 340; 177/180, 181, 50, 145; 164/457, 155

[56] References Cited

U.S. PATENT DOCUMENTS 3,910,737 10/1975 Shimada et al. ................... 264/40.4
4,664,207 5/1987 Knothe et al. ....................... 177/181
4,755,122 7/1988 Schmidt .............................. 264/40.4

Primary Examiner—Jill L. Heitbrink
Attorney, Agent, or Firm—Toren, McGeady & Associates

[57] ABSTRACT

A method and apparatus for quality control of molded articles manufactured by injection molding machines or die casting machines. The method includes weighing individual molded articles after they have been ejected from the mold. The actual weight of the molded article is compared to a desired weight and the resulting difference signal is used for influencing the injection molding machine or the die casting machine in order to correct the weight of the molded articles. The molded articles are each guided as exactly as possible onto the center of a weighing zone of the test balance and the entire weighing zone is protected at least during each weighing procedure against ambient influences. The apparatus for carrying out the method includes an electronic test balance arranged after a discharge hopper for the molded articles. The electronic test balance is used for providing an output signal for influencing the injection molding machine or the die casting machine. A centering duct for the molded articles can be moved from the discharge hopper at least temporarily closely to the weighing zone of the test zone. A protective hood can be placed at least temporarily over the entire weighing zone.

6 Claims, 2 Drawing Sheets

METHOD AND APPARATUS FOR QUALITY CONTROL OF MOLDED ARTICLES MANUFACTURED BY INJECTION MOLDING MACHINES OR DIE CASTING MACHINES

BACKGROUND OF THE INVENTION

1. Field of the Invention

The present invention relates to a method and apparatus for quality control of molded articles manufactured by means of injection molding machines o die casting machines.

Specifically, the present invention relates to a method which includes weighing individual molded articles after they have been ejected from the mold. The actual weight of the molded articles is compared to a desired weight and the resulting difference signal is used for influencing the injection molding machine or the die casting machine and/or the injection mold in order to correct the weight of the molded articles.

The present invention further relates to an apparatus for carrying out this method which includes an electronic test balance arranged after a discharge hopper for the molded articles of the injection molding machine or die casting machine. The electronic test balance is used for providing an output signal for influencing the injection molding machine or die casting machine and/or the injection mold.

2. Description of the Related Art

In known quality control systems of the above-described type, so-called discharge test balances are used which usually operate with a range of accuracy of ±0.1 g and which are constructed in such a way that only a time period of less than 1 second is required for each individual weighing procedure. Within this short period of time, the output signal of the discharge test balance can be utilized for influencing the control of the injection molding machine or die casting machine and/or the injection molding tool of the machine, in order to effect a further optimizing of the quality of the subsequently manufactured molded articles.

The known quality control systems of the above-described type can be used in a manufacturing plant in connection with an operating injection molding machine as long as a range of accuracy of ±0.1 g is sufficient for the quality determination of the molded articles.

However, in many cases, the molded articles must meet quality requirements in which a range of accuracy of the above-mentioned order of magnitude is entirely insufficient. This is because in certain situations it may be that ranges of accuracy are required which are between ±0.01 g and ±0.001 g.

In such cases, in accordance with the known prior art, an exact weighing of the individual molded articles under laboratory conditions is required. Thus, the quality control was substantially time-consuming and expensive.

It is, therefore, the primary object of the present invention to provide a quality control system of the abovedescribed type which can be used in a manufacturing plant in connection with operating injection molding machines or die casting machines and which can be utilized optionally either in the manner of a discharge test balance or in the manner of a laboratory balance.

SUMMARY OF THE INVENTION

The method according to the present invention comprises guiding each molded article as exactly as possible on the center of a weighing zone and protecting the entire weighing zone at least during each weighing procedure against ambient influences.

The method according to the invention has the advantage that the quality control can be carried out particularly economically. This is true if only the so-called discharge test weighing is to be carried out, or if an exact weighing under laboratory conditions must be carried out. The reason for this is that any discharge test weighing can be followed immediately by an exact weighing under laboratory conditions.

If a discharge test weighing causes the closing procedure of the injection molding tool or the next work step of the injection molding machine or die casting machine to commence, the test balance can be automatically switched from the so-called dynamic weighing procedure to the static weighing procedure. Subsequently, after a settling period lasting only a few seconds, for example, approximately 3 seconds, the test balance determines the weight of the molded article placed on the weighing zone within an increased accuracy range determined by the accuracy of the balance used, of, for example, ±0.01 g or, in extreme cases, even of, for example, ±0.001 g. The weight exactly determined by means of this static weighing procedure can then be compared with two predetermined limit values within the machine control. It is then determined by means of these limit values whether the molded article is an article to be accepted or an article to be rejected. Accepted articles and rejected articles can then be conveyed away from the region of the weighing zone in different directions.

In accordance with a useful additional feature of the present invention, the conveying of the molded article onto the weighing zone and the protecting of the weighing zone are carried out one after the other with respect to time, because the discharge weighing step and the exact weighing step are also carried out one after the other. It is only necessary to protect the weighing zone against ambient influences if an exact weighing step is to be carried out after the discharge weighing step.

In accordance with another feature of the present invention, the protecting of the weighing zone against ambient influences includes an essentially air-tight closing off of the weighing zone. As a result, even slight air movements which could influence the weighing accuracy cannot reach the region of the weighing zone.

The apparatus according to the present invention for carrying out the above-described method essentially includes a centering duct for the molded articles which centering duct can be moved from the discharge hopper of the injection molding machine or die casting machine at least temporarily closely to the weighing zone of the test balance. Moreover, a protective hood can be placed, also at least temporarily, over the entire weighing zone.

As a result of the measures described above, each individual molded article can be moved, even for the dynamic weighing procedure, very exactly into the most sensitive region of the weighing zone, and thus, a quick and accurate comparison of actual value and desired value is ensured. Also, during the subsequent static weighing procedure, it is important that all ambient influences which could impair an exact weighing under laboratory conditions are kept away from the weighing zone.

In accordance with a further development of the invention, at least the outlet end of the centering duct for the molded articles has a diameter which closely corresponds to the maximum size of the molded article. By directing such a centering duct toward the center of the weighing zone of the test balance, optimum weighing conditions are provided for carrying out a dynamic discharge weighing as well as a static precise weighing.

In accordance with another feature of the present invention, the centering duct for the molded articles is arranged so as to be raisable and lowerable relative to the plane of the weighing zone of the test balance.

In accordance with another feature, the protective hood is formed by a slide member which is adjustable perpendicularly to the direction of movement of the centering duct and by a stop wall oriented transversely of the direction of movement of the slide member. The slide member and the stop wall are sealable relative to a base which surrounds the weighing zone of the test balance.

The stop wall for the sliding member of the protective hood may be formed by the web of an approximately U-shaped discharge slide for the molded articles. The discharge slide is a structural part of the test balance and serves to convey the accepted articles as well as the rejected articles from the region of the test balance.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DESCRIPTION OF THE PREFERRED EMBODIMENT

Figure 1:
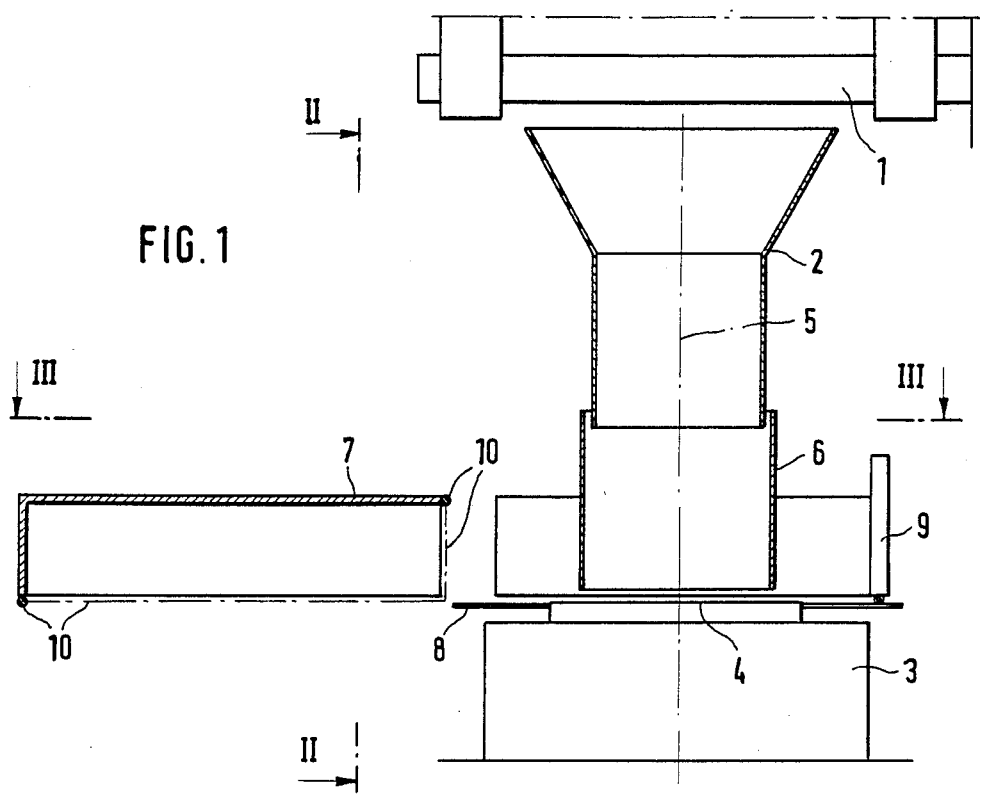
FIG. 1 is a schematic vertical sectional view of an apparatus according to the present invention for the quality control of molded articles manufactured by injection molding machines or die casting machines.

FIG. 1 of the drawing shows of a complete injection molding machine only a portion of the closing unit 1 in which the mold halves of the injection mold are received.

A so-called discharge hopper 2 is mounted in the injection molding machine underneath the closing unit 1. The molded articles ejected or otherwise removed from the injection mold after each individual injection molding procedure drop into the discharge hopper 2.

A test balance 3 is mounted underneath and at a distance from the discharge hopper 2. The test balance 3 is an electronic balance and is suitable preferably for so-called CNC-operation. The test balance 3 is placed in such a way that the weighing dish forming the weighing zone 4 preferably is in axial alignment with the longitudinal axis 5 of the discharge hopper 2.

The distance between the lower end of the discharge hopper 2 and the weighing zone of the test balance 3 can be completely bridged at least temporarily by means of a centering duct 6 for the molded articles. The centering duct 6 is also in axial alignment with the longitudinal axis 5 of the discharge hopper 2. The centering duct 6 is mounted so as to be raisable and lowerable. Specifically, the centering duct 6 can be moved quickly and exactly by means of drive units, for example, compressed-air cylinders, not shown, between a lower end position shown in FIGS. 1 and 2 and an upper end position shown in FIG. 4.

Figure 2:
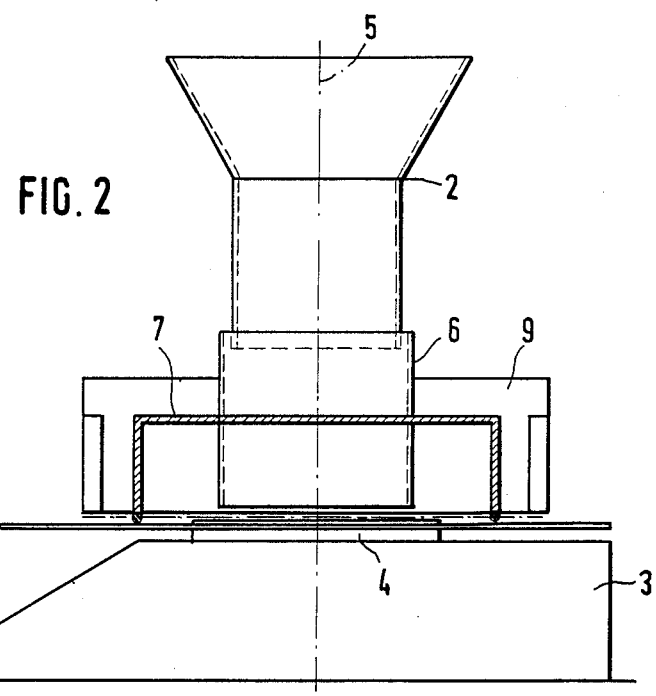
FIG. 2 is a sectional view taken along sectional line II—II in FIG. 1.

When the centering duct 6 is in the lower end position, the duct 6 is spaced only by a slight distance from the plane of the weighing zone 4, as can be clearly seen by FIGS. 1 and 2. On the other hand, when the centering duct 6 is in the upper end position, a relatively large distance exists between the lower end of the centering duct 6 and the base of the weighing zone 4, as can be seen in FIG. 4.

Figure 4:
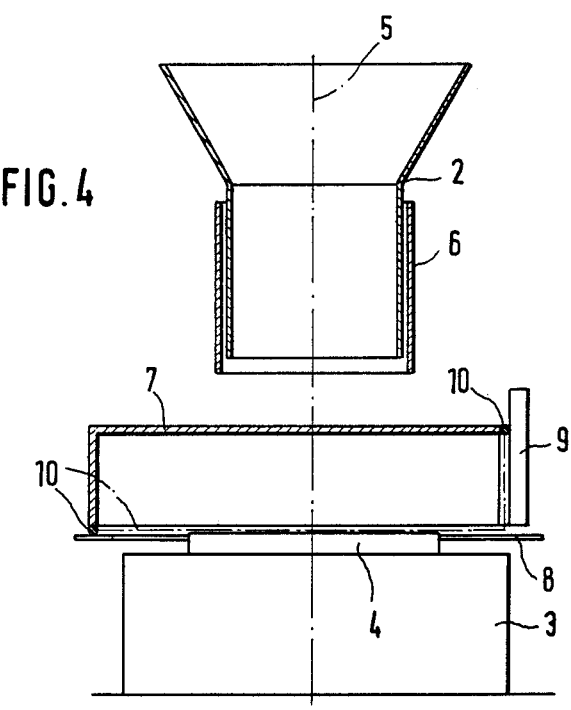
FIG. 4 is a vertical sectional view corresponding to FIG. 1, however, showing the apparatus in a different position of operation.

Contrary to the construction shown in FIGS. 1, 2 and 4, it may be advantageous to provide at least the outlet end of the centering duct 6 with only such a diameter which is adjusted relatively closely to the maximum size of the molded articles. As a result, it is ensured that the molded articles dropping through the discharge hopper 2 onto the weighing zone 4 of the test balance 3 are placed essentially centrally on the weighing zone 4 of the test balance 3 and, thus, an exact weighing is ensured. The fact that the centering duct 6 has in its lower end position only a relatively small spacing from the weighing zone 4 further ensures an exactly centered alignment of the molded article and, thus, the molded article remains in this aligned position on the weighing zone 4 when the centering duct 6 is raised into the position shown in FIG. 4.

Figure 3:
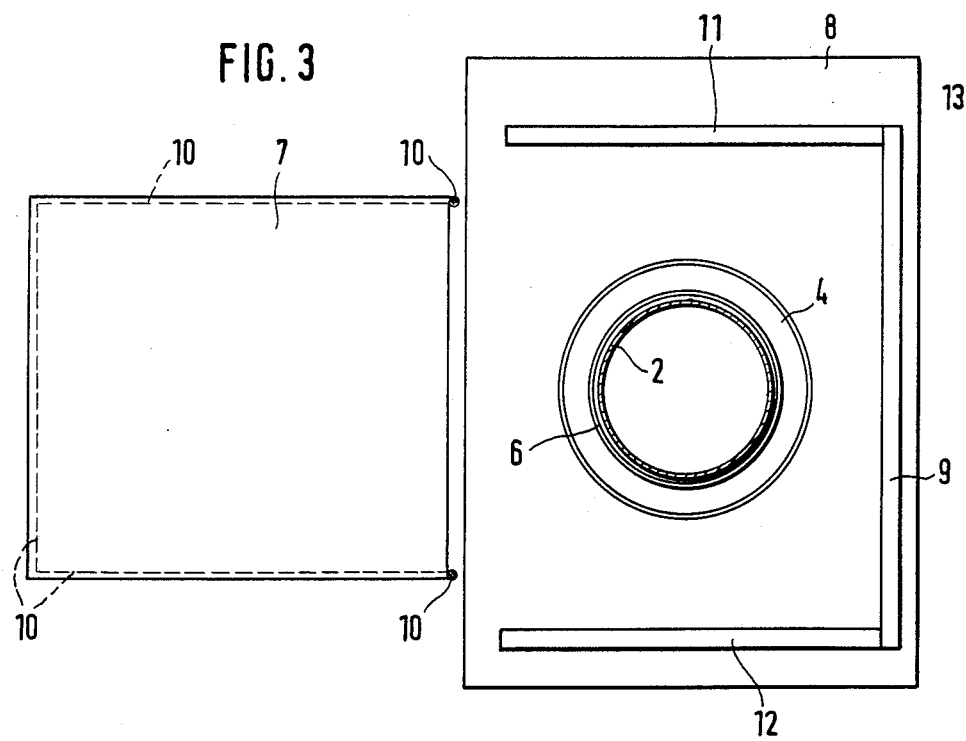
FIG. 3 is a sectional view taken along sectional line III—III in FIG. 1.

In the position of operation of the entire quality control apparatus according to the present invention shown in FIGS. 1 to 3 of the drawing, the test balance 3 can be operated as a so-called discharge test balance which responds with a so-called dynamic weighing procedure to a molded article which drops through the discharge hopper 2 onto the weighing zone 4 of the test balance 3. The test balance operates in this case with a range of accuracy of ±0.1 g and determines the weight of the molded article within a time period of less than 1 second, for example, within 0.6 seconds. The actual weight of the molded article is then compared to a desired weight stored in the test balance 3. When the actual value differs from the desired value, a difference signal is created which then acts so as to control and/or regulate the injection molding machine and/or the injection mold of the machine, in order to close the gap between the actual weight and the desired weight.

Since, in most cases, the so-called dynamic discharge weighing is not sufficient for optimizing the quality of high-quality molded articles, it is frequently necessary to perform following the dynamic discharge weighing a static precise weighing under laboratory conditions which provide an accuracy range which may be, for example, ±0.01 g and ±0.001 g.

However, such a precise static weighing procedure can only be carried out when the molded article is in a complete condition of rest on the weighing zone 4 of the test balance 3.

For this purpose, following the dynamic discharge weighing procedure, the test balance 3 is automatically switched to the static precise weighing procedure. The precise weighing procedure takes place during the next following injection molding procedure of the injection molding machine. Until the precise static weighing procedure is commenced, a period of time of several seconds, for example, 3 seconds, is available as a settling time for the molded article placed on the weighing zone 4 of the test balance 3.

In order to be able to commence the precise static weighing procedure of the test balance 3 without impairing the weighing results with the ambient influences existing usually in manufacturing plants, the quality control apparatus according to the invention includes a protective hood 7 which can be moved temporarily from its position of rest shown in FIGS. 1 to 3 into its position of operation shown in FIG. 4 after the centering duct 6 has been raised from the lowered position.

The movement of the protective hood 7 between the position of rest shown in FIGS. 1 and 3 and the position of operation shown in FIG. 4 can be effected by means of positioning drives, for example, pressure medium cylinders, not shown. The protective hood 7 interacts in the position of operation shown in FIG. 4 with a base plate 8 which surrounds the weighing zone 4 of the test balance 3 as well as with a stop wall 9 which is arranged above the base plate 8, as can be clearly seen in FIG. 4 of the drawing. In order to enclose the weighing zone 4 within the protective hood 7 as air-tight as possible, sealing elements 10 are provided along the edges of the protective hood 7. The sealing elements 10 are mounted in such a way that they come into sealing contact with the base plate 8 and partially with the stop wall 9 when the protective hood 7 is moved into its position of operation shown in FIG. 4.

The positioning drives for the centering duct 6 and for the protective hood 7 can be coupled to each other in such a way that a synchronous sequence of movements is created, so that the centering duct 6 and the protective hood 7 do not impair the movements of each other.

After the protective hood 7 has been moved into its position of operation shown in FIG. 4, the precise weighing procedure under laboratory-type conditions takes place. The weight of the molded article determined by this precise weighing procedure is then compared to two internally stored limit values. On the basis of these limit values, the molded articles to be accepted and the molded articles to be rejected are determined and, subsequently, are either removed towards the side for acceptable articles or the side for rejected articles. To make this possible, two transversely projecting arms 11 and 12 are attached to stop wall 9 in order to form an approximately U-shaped slide member 13. This slide member 13 can be moved above the base plate 8 and the weighing zone 4 parallel to the longitudinal direction of the stop wall 9.

The slide member 13 may also be driven by means of compressed-air cylinders. By moving the slide member 13 from the position shown in FIG. 3 in one direction, the arm 11 of the slide member 13 may remove, for example, the articles to be accepted. If the slide member 13 is moved from the position shown in FIG. 3 to the other direction, the arm 12 of the slide member 13 removes molded articles to be rejected from the region of the weighing zone 4.

It should also be mentioned that an optimum operation of the quality control apparatus according to the present invention is obtained if not only the centering duct 6 has a section which is relatively closely adapted to the maximum size of the molded article, but if the protective hood 7 is also selected with dimensions which are as small as possible. This is because it is essential that as little space as possible exists above the weighing zone 4 of the test balance 3 for the precise static weighing procedure. As a result, an undesired effect of the cooling injection molded article can be reduced which resides in that the cooling article creates air movements in its vicinity.

If it is to be ensured that the centering duct 6 is safely sealed off at its lower end, the protective hood 7 and the centering duct 6 can be made to move in the same direction.

In that case, the protective hood 7 is mounted so as to be vertically movable independently of the centering duct 6 and is equipped with a sealing slide member which can be placed in front of the lower end of the centering duct 6 when the protective hood 7 is lowered and the centering duct 6 is raised.

However, in that case, additional sealing elements are required for the protective hood 7 in addition to the sealing element 10. The additional sealing elements are effective between the protective hood 7 and the centering duct 6. The additional sealing elements should be provided in such a way that they assume an effective position when the protective hood 7 is in its lowered position of operation and the centering duct 6 is in its raised position of rest While a specific embodiment of the invention has been shown and described in detail to illustrate the application of the inventive principles, it will be understood that the invention may be embodied otherwise without departing from such principles.

We claim:

1. A method for quality control of molded articles manufactured by means of injection molding machines or die casting machines, the method comprising the steps of:
   manufacturing and ejecting the molded articles;
   then initially accurately guiding each molded article automatically onto the center of a weighing zone of a test balance;
   immediately subsequently carrying out a dynamic discharge weighing procedure of the molded article;
   comparing the dynamic discharge weight of the molded articles to a desired weight and creating a difference signal;
   controlling the injection molding machine or the die casting machine with the resulting difference signal to correct the weight of the molded articles;
   protecting the entire weighing zone immediately after the dynamic discharge weighing of each individual molded article against ambient influences; and then
   carrying out a precise static weighing procedure using said weighing zone of said test balance to determine whether the molded article is acceptable.

2. The method according to claim 1, wherein the step of protecting the weighing zone against ambient influences includes an essentially air-tight closing off of the weighing zone.

3. In an apparatus for quality control of molded articles manufactured by means of injection molding machines or die casting machines, the injection molding machines or die casting machines including a discharge hopper for discharging the molded articles, the apparatus including an electronic test balance for individually weighing the molded articles discharged by the discharge hopper, the test balance including a weighing zone and means for generating an output signal for influencing the injection molding machine or the die casting machine in order to correct the weight of the molded articles, the improvement comprising a centering duct means for the molded articles, the centering duct means being movable at least temporarily from the discharge hopper toward the weighing zone, and a protective hood, the protective hood being movable at least temporarily over the weighing zone.

4. The apparatus according to claim 3, the centering duct means including an outlet end, at least the outlet end of the centering duct means having a diameter which closely corresponds to a maximum size of the molded articles.

5. The apparatus according to claim 3, wherein the weighing zone of the test balance is in a weighing zone plane, the centering duct means being arranged so as to be raisable and lowerable relative to the weighing zone plane.

6. The apparatus according to claim 5, wherein the protective hood includes a slide member which is movable in a direction perpendicular to the direction of movement of the centering duct means, the protective hood further includes a stop wall extending transversely of the direction of movement of the slide member, a base plate surrounding the weighing zone of the test balance, and sealing means for sealing the slide member and the stop wall relative to the base plates.

* * * * *